United States Patent
Holtorf

(10) Patent No.: US 12,304,635 B2
(45) Date of Patent: May 20, 2025

(54) COMPARTMENT FOR A CABIN IN A VEHICLE WITH RETRACTABLE DOOR ANGLE LIMITER

(71) Applicant: Airbus Operations GmbH, Hamburg (DE)

(72) Inventor: Boris Holtorf, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/342,894

(22) Filed: Jun. 28, 2023

(65) Prior Publication Data
US 2024/0002056 A1    Jan. 4, 2024

(30) Foreign Application Priority Data

Jun. 29, 2022 (EP) ..................................... 22181951

(51) Int. Cl.
*B64D 11/04* (2006.01)
(52) U.S. Cl.
CPC ..................................... *B64D 11/04* (2013.01)
(58) Field of Classification Search
CPC ............................... B64D 11/04; F25D 23/02
See application file for complete search history.

(56) References Cited

U.S. PATENT DOCUMENTS

| | | | |
|---|---|---|---|
| 2,827,863 A | 3/1958 | Hyman | |
| 5,074,496 A * | 12/1991 | Rezag | B64D 11/04 244/118.1 |
| 2019/0049170 A1 * | 2/2019 | Reuter | F25D 11/02 |
| 2021/0078708 A1 * | 3/2021 | Brownlie | B64D 11/04 |
| 2023/0071125 A1 * | 3/2023 | Tracey | B64D 11/0007 |
| 2023/0257120 A1 * | 8/2023 | Young | B64D 11/04 244/118.5 |
| 2024/0002055 A1 * | 1/2024 | Smakman | B64D 11/04 |

FOREIGN PATENT DOCUMENTS

FR           2834050 A1        6/2003

OTHER PUBLICATIONS

European Search Report for Application No. 22181951 dated Nov. 23, 2022.

* cited by examiner

*Primary Examiner* — Joshua J Michener
*Assistant Examiner* — Cindi M Curry
(74) *Attorney, Agent, or Firm* — KDW Firm PLLC

(57) ABSTRACT

A compartment for a cabin in a vehicle includes a compartment enclosure assembly defining an outer boundary of the compartment and having a receiving space, a stop body supported on or in the compartment enclosure assembly, and a locking device. The receiving space is accessible from a front of the compartment enclosure assembly, wherein the stop body is pivotally mounted on or in the compartment enclosure assembly about a pivot axis or slidably along an axis between a retracted position, in which the stop body does not project from the front, and an extended position, in which the stop body projects from the front to provide an end stop for a door of the compartment or for a door of an insert to be inserted into the receiving space, wherein the locking device is configured to selectively lock and unlock the stop body in its retracted position.

15 Claims, 6 Drawing Sheets

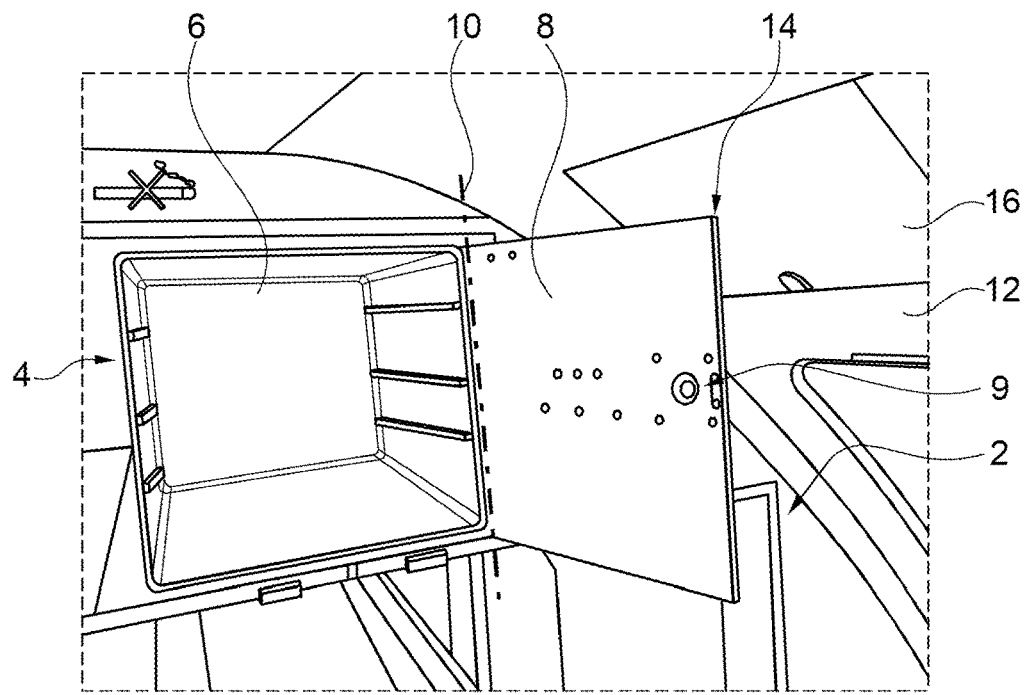
Prior art  Fig. 1
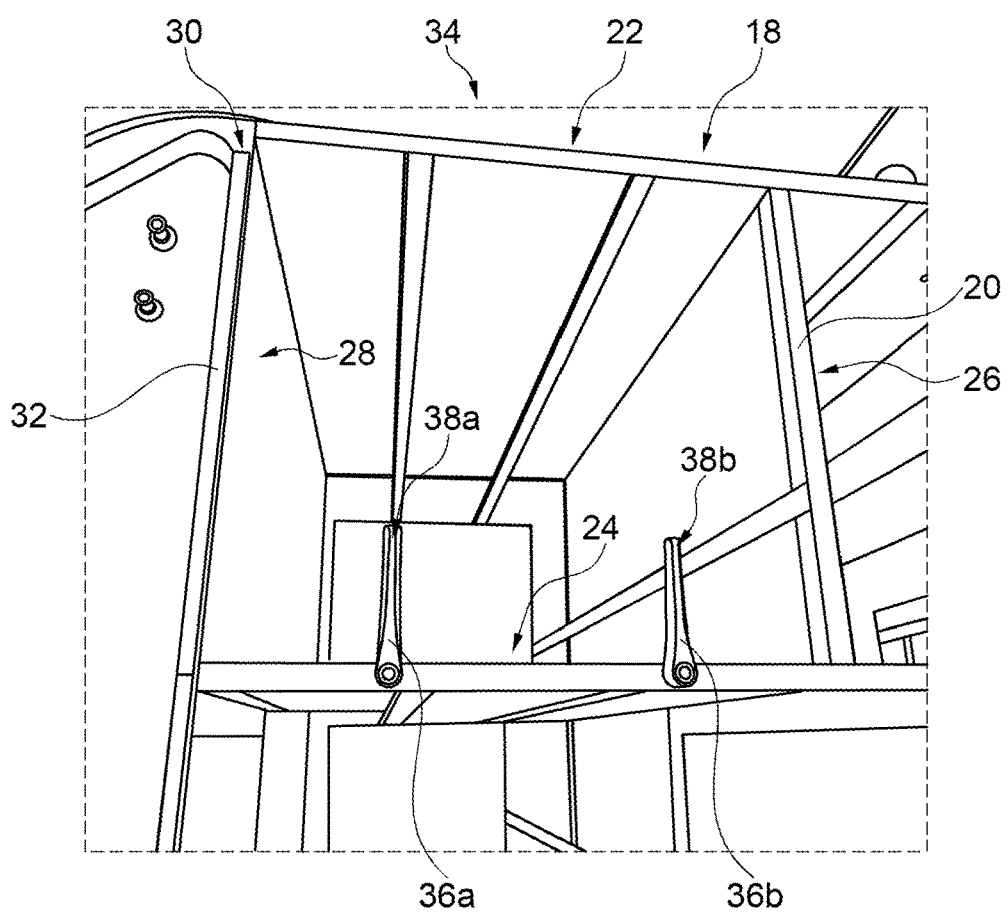
Fig. 2

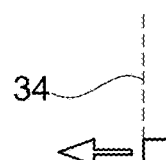
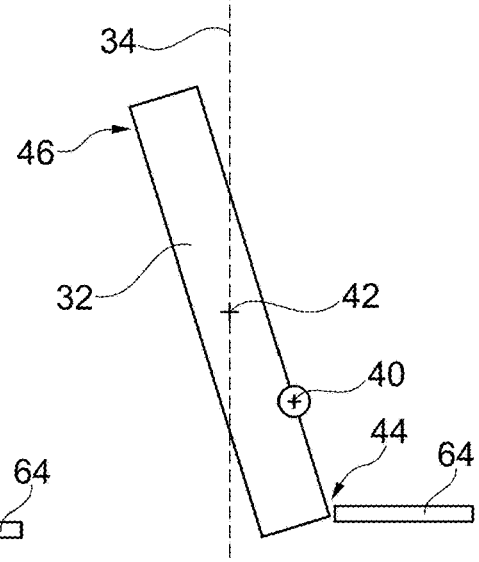
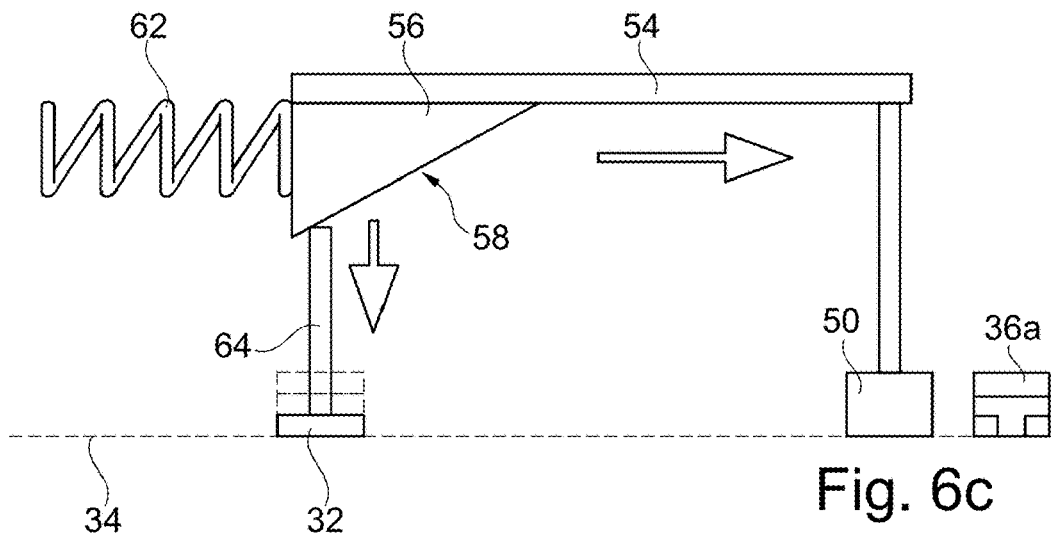
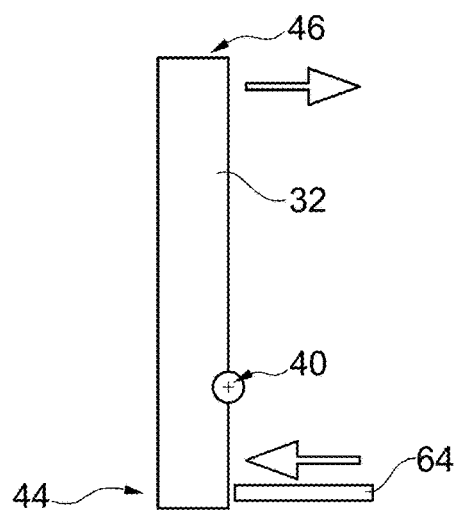

COMPARTMENT FOR A CABIN IN A VEHICLE WITH RETRACTABLE DOOR ANGLE LIMITER

TECHNICAL FIELD

The disclosure herein relates to a compartment for a cabin in a vehicle, an installation equipment, in particular a cabin monument for a vehicle, in particular an aircraft, as well as an aircraft.

BACKGROUND

Commercial and transport aircraft usually comprise a cabin with cabin monuments, such as a galley, installed therein. Various cabin monuments comprise compartments for receiving items, such as standard units. Depending on the type of cabin monument and the selected standard unit, in some installations it may happen that the door of a standard unit clashes with a part of the door frame lining when being opened. The exact location of a contacting point depends on the monument setup and the door frame lining adjustment, standard unit door width, exact position of the standard unit during opening process, pressurized or non-pressurized fuselage, etc. As prediction of the exact contacting point is almost impossible, known solutions are limited to providing a protective material layer on the door frame lining in the form of metallic or plastic materials; and to providing large bumpers on the door frame lining or compartment walls.

SUMMARY

It is thus an object of the subject matter herein to disclose an alternative compartment with an improved protection for a door of or in the compartment or surrounding cabin lining parts, wherein a manual interaction should be as little as possible and wherein the protection should be effective without knowing the exact contact point between the door and other equipment.

The object is met by a compartment for a cabin in a vehicle having features disclosed herein. Advantageous embodiments and further improvements may be gathered from the following description.

A compartment for a cabin in a vehicle is proposed, comprising a compartment enclosure assembly defining an outer boundary of the compartment and comprising a receiving space, a stop body supported on or in the compartment enclosure assembly, and a locking device, wherein the receiving space is arranged to be accessible from a front of the compartment enclosure assembly, wherein the stop body is pivotally mounted on or in the compartment housing assembly about a pivot axis or slidably along an axis between a retracted position, in which the stop body does not project from the front, and an extended position, in which the stop body projects from the front to provide an end stop for a door of the compartment or for a door of an insert to be inserted into the receiving space, and wherein the locking device is adapted to selectively lock and unlock the stop body in its retracted position.

The compartment enclosure assembly is to be understood as an arrangement of walls, frames, a framework structure that define the outer boundary of the compartment according to the disclosure herein. The compartment enclosure assembly may also be an integral part of a superordinate piece of installation equipment, e.g. a part of a monument, in particular a galley section inside an aircraft cabin. The compartment according to the disclosure herein is used for storing items in the receiving space. In particular for the use in an aircraft, the compartment may comprise a swivable door to retain the stored items. For supporting the swivable door, a hinge may be provided, which has a hinge axis that is preferably vertical. This means, that the hinge axis extends in the z direction in an aircraft-fixed coordinate system, if it is installed in an aircraft cabin.

However, the receiving space may simply be designed to hold a separate device, which comprises such a hinge and a door supported therewith. For example, if the compartment is installed in an aircraft galley or another cabin monument, such a device may be a so-called "standard unit" that is replaceably placeable in the receiving space. The standard unit may comprise a door, which is supported by a vertical hinge.

The compartment enclosure assembly may be made from aluminium, a composite material, or a combination thereof. It may comprise a box-like shape, wherein the receiving space is accessible from the front.

The stop body is a part that is intended to be selectively moved from a retracted position into an extended position, wherein the stop body at least partially protrudes from the front of the compartment enclosure assembly in the extended position. When the stop body protrudes from the front of the compartment enclosure assembly, a door that swivels from the front outwards to open will touch the stop body at a certain opening angle. It is conceivable that the stop body is arranged in a section of the compartment enclosure assembly adjacent to the respective swivel axis. Thus, when the door swivels more than 90°, a part of the door will touch a part of the stop body that protrudes from the front, such that the stop body prevents the door from swiveling further. Adjacent installations, such as cabin linings, oxygen mask containers or other components, will be protected from an impact of the door.

The stop body may be moved by a user, for example by pulling the stop body out of the compartment enclosure assembly before opening the door. It may also be driven by a motor or a spindle upon pressing a button at the compartment to extend or retract. Furthermore, it may be moved automatically driven by gravity, as explained further below, or by a drive. It may move perpendicularly to the front along a linear course. However, it may also pivot outwards to extend and inwards to retract. For example, the stop body may be an elongate element that is arranged perpendicularly to the front and that may be pulled out or pushed into the compartment enclosure assembly.

The locking device is provided for selectively locking the stop body. As mentioned further below, and inadvertent movement of the stop body can thus be prevented to maintain a clean front. The locking device may be mechanically or logically coupled with other devices, such as a latching device, to improve the usability of the compartment. For example, if the stop body is moved by a user into an extended or retracted position, the locking device may be coupled with the stop body in a way that a user may press onto the stop body to lock it into the retracted state or to unlock it again. Other variants are conceivable, which are not coupled with the stop body, but are provided as separate devices.

In an advantageous embodiment, the stop body is pivotally mounted and has a center of gravity, which is distanced from the pivot axis, such that the stop body automatically pivots into the extended position by gravity when the locking device unlocks the stop body. To simplify the function of the stop body, it is designed to pivot about the pivot axis automatically. For achieving this, the pivot axis is arranged in a distance from its center of gravity. For example, the stop body may be vertically arranged in the compartment enclosure assembly and is substantially flush with or resting on the front in the retracted position. In this case, the pivot axis may be placed rearwards from the front and downwards from the center of gravity of the stop body. If the stop body is not locked by the locking device, it simply pivots driven by gravity in a way that the upper end of the stop body protrudes from the front and in the lower end slightly moves inwards. It is to be understood, that the compartment enclosure assembly requires a sufficient installation space for housing the stop body in its both states.

In an advantageous embodiment, the stop body has an elongate shape with a first end and an opposite second end, wherein the second end is arranged vertically above the first end. Thus, the stop body may be a bar or a rod, or any other shape with a substantially constant cross-sectional profile, such as a square, a rectangle, a T-profile, or the like along its length. The stop body may extend substantially vertically in the compartment enclosure assembly, wherein the center of gravity is arranged in its center. Thus, the pivot axis is in the lower half of the compartment enclosure assembly. By providing such a stop body, the required installation space for integrating the stop body is minimized.

In an advantageous embodiment, the second end moves away from the front to protrude from the front in the extended position. Thus, in this state, the second end sticks out from the front. In the extended position, the stop body and a plane spanned up by the front enclose an angle that is greater than zero. Depending on the spatial arrangement of the door hinge and the stop body, the stop body may only need to protrude a few centimeters from the front to provide a suitable end stop for the door.

In an advantageous embodiment, the stop body is substantially flush with or resting on the front in the retracted position. In situations, in which an interaction with the door or the receiving space is not required, the stop body substantially does not protrude from the front and thus does not create a potential obstacle in the assist space of an aircraft cabin or the like. Also, the appearance of the compartment according to the disclosure herein is harmonic when the stop body is retracted.

In an advantageous embodiment, the locking device comprises a wedge body, which is movably supported on or in the compartment enclosure assembly so as to be slidable parallel to the pivot axis between a first sliding position and a second sliding position, wherein the wedge body comprises a wedge surface that faces to the front, wherein a lower rear section of the stop body is coupled with a wedge surface of the wedge body, and wherein the wedge body is designed to move the stop body into the retracted position and to block the stop body in the first sliding position and to release the stop body in the second sliding position. By sliding the wedge body parallel to the pivot axis, the inclined wedge surface travels along a rear side of the stop body. The lower rear section of the stop body may be directly in contact with the wedge surface or a separate element is arranged between the stop body and the wedge surface. This may, for example, be a push pin, which is slidably supported in a direction perpendicular to a plane spanned up by the front. Thus, such a push pin may be in contact with both the wedge surface and the lower rear section. A local thickness of the wedge body behind the stop body changes depending on the sliding position. When the wedge body is in the second sliding position, it has the smallest local thickness in a position behind the stop body, such that the rear side of the stop body can move between a forwardmost position, in which the stop body is retracted, to a rear position until it is held by the wedge surface, either directly or through separate elements. Hence, in the second sliding position the stop body is not prevented from pivoting. However, in the first sliding position, the wedge body has the greatest local thickness directly behind the stop body, such that a geometrical constraint between the wedge body and the stop body, either directly or through separate elements, is provided. The stop body then remains in the retracted position, in which the rear side of the stop body contacts the wedge surface. Hence, the stop body is prevented from pivoting in the first sliding position. The wedge body may be coupled with an operating knob at the front of the compartment enclosure assembly, wherein the user may slide the wedge body by moving the operating knob parallel to the pivot axis in order to selectively lock or unlock the stop body.

In an example embodiment, the locking device is arranged at a bottom wall of the compartment enclosure assembly, such that the wedge body is movable in a lateral direction along the bottom wall. Hence, the locking device is placed in the vicinity of latching devices or the like that are usually found in aircraft related compartments, in particular in galley applications. A latching device is often provided for latching doors to avoid inadvertent opening of the door during flight. Often, such a latching device is arranged at a bottom wall, for example in compartments in a galley section. Thus, there may already be a sufficient installation space in common compartments for providing the operating knob or the like that is coupled with that wedge body.

In an advantageous embodiment, the locking device comprises a resilient element that urges the wedge body into the first sliding position. Thus, the stop body always reverts to the retracted state if it is not blocked, such that it does not protrude from the front when not needed. In particular during time-pressing operation of the compartment in a cramped space, this saves time and reduces the number of steps required for handling items stored in the compartment.

In an advantageous embodiment, the compartment enclosure assembly comprises at least one latching element, which is rotatably supported on the front to selectively move it in front of the receiving space or to move it away from the receiving space. As mentioned before, such a latching element is capable of latching a door in a compartment in its closed state. Often, latching elements are designed as levers that are rotatably supported on one end, wherein the other end can be brought forward of the door. Hence, opening the door is prevented when the latching element is placed forward of the door.

In an advantageous embodiment, the locking device and the at least one latching element are arranged on the compartment enclosure assembly in such a way that the latching element is blocked in front of the receiving space when the locking device is in the first sliding position, and that the at least one latching element can be moved away from the receiving space when the locking device is in the second sliding position. Rotating the respective latching element is thus only possible when the operating knob or the like of the locking device is moved away from the first sliding position. Hence, the distance between the first sliding position and the second sliding position is sufficient to move the latching device away from the front. This is also a very intuitive way of activating the stop body when unlatching the respective door, since the operating knob or the like is in the way of the latching device and just needs to be moved away to let the latching device into an open position. Unlatching will only be possible if the locking device is deactivated. Again, when the respective latching element is moved to be in front of the respective door, particularly with the resilient element mentioned above, the locking device automatically reverts into the locked state.

In an advantageous embodiment, the compartment enclosure assembly comprises a recess in a lateral wall, in which the stop body is supported. The recess allows to place the stop body in the compartment enclosure assembly in a flush manner, such that it does not stick out the front in the retracted position.

In an advantageous embodiment, the receiving space is substantially hollow and designed for receiving a standard unit. Consequently, the door whose opening angle is to be limited belongs to a standard unit. In an alternative, the compartment may comprise the door and is designed for receiving other items.

The disclosure herein further relates to an installation equipment, in particular a cabin monument and preferably a galley for a cabin of an aircraft, comprising at least one compartment according to the above. The installation equipment, or the cabin monument, respectively, may extend from an aisle in the cabin to a nearest side wall of the cabin. However, the installation equipment may also extend over the whole width of the cabin.

In an advantageous embodiment, the at least one compartment is arranged in a top half of the installation equipment. The installation equipment in this case may be a monument that has a distinct extension in a vertical direction. For example, it may be placed on or slightly above a cabin floor and extend towards a cabin ceiling. In the top half of the installation equipment, the sidewall of the cabin may comprise a significant curvature, if the installation equipment is directly arranged at the sidewall. If the compartment is arranged directly adjacent to the sidewall, the stop body provides an excellent angle limitation.

In an advantageous embodiment, at least one lateral wall of the installation equipment is curved to complement a shape of a curved fuselage of the aircraft, in which the cabin is created. The installation equipment, in particular a galley or another type of cabin monument, may thus be arranged flushly at a sidewall of the cabin.

Furthermore, the disclosure herein relates to an aircraft comprising a cabin and having at least one installation equipment according to the above and/or at least one compartment according to the above.

BRIEF DESCRIPTION OF THE DRAWINGS

In the following, the attached drawings are used to illustrate example embodiments in more detail. The illustrations are schematic and not to scale. Identical reference numerals refer to identical or similar elements. They show:

FIG. 1 shows a galley according to the prior art.
FIG. 2 shows a compartment in a front view.
FIG. 6a through 6d show locking the stop body through the push pin in various illustrations.

DETAILED DESCRIPTION

Figure 3:
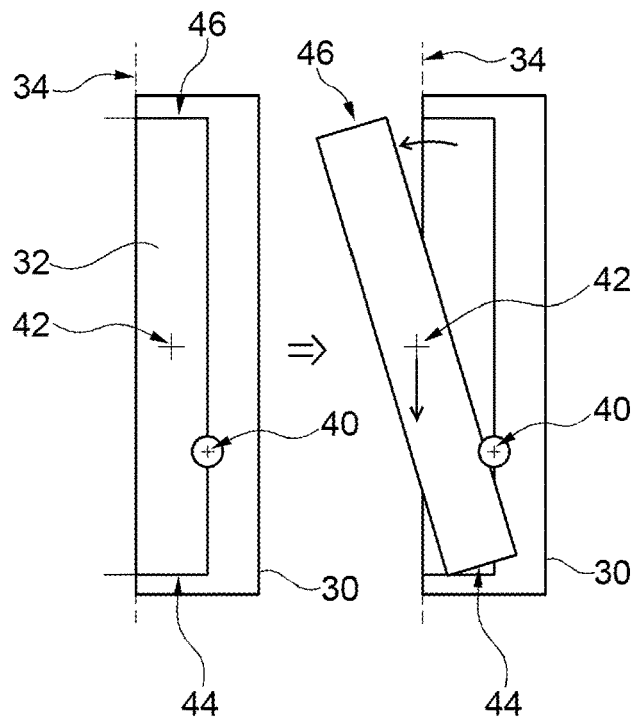
FIG. 3 shows a stop body in two lateral views.

FIG. 1 shows a part of a galley 2 in a cabin of an aircraft. Here, a compartment 4 is provided in the galley 2, which is designed for receiving a standard unit 6 having a door 8, which is swivably supported on a hinge 10. A door lock 9 is provided on the door 8. Here, the compartment 4 is arranged at a top of the galley 2 and close to a lateral wall 12 of the cabin. In this illustration, the door 8 is in an open state, in which an upper corner 14 of the door 8 contacts a box 16, which is arranged in the lateral wall 12 and is used for storing oxygen masks. The door 8 comprises a length of almost 30 cm and an impact on the box 16 should be avoided. A fixed end stop for contacting the door 8 that protrudes from the galley 2 would always reach into an assist space, which is not acceptable. Also, the exact placement of the corner 14 is hardly predictable since the standard unit 6 is a replaceable item and the exact dimensions and the swiveling path of the doors 8 of different manufacturers of standard units 6 may differ.

FIG. 2 shows a compartment 18 in the galley 2 as an example of an installation equipment, or cabin monument, respectively, which comprises a compartment enclosure assembly 20, which comprises an upper wall 22, a bottom wall 24, a first lateral wall 26 and a second lateral wall 28. At the second lateral wall 28, a recess 30 is provided, which substantially extends along the entire length of the second lateral wall 28 and houses a stop body 32, which is pivotally supported on the second lateral wall 28. The stop body 32 is a bar- or rod-like shaped elongate body, which may be made from a metallic material, such as aluminium, a plastic material, or a combination thereof. It may be solid or at least partially hollow.

In FIG. 2, it is arranged flush in a front 34 of the compartment 18. At the bottom wall 24, two latching devices 36a and 36b are provided. These are designed in the form of levers that are rotatably supported on one of their ends. They both comprise a free end 38a and 38b that can be handled by a user to place the respective latching device 36a or 36b into an upright or a horizontal position. In the upright position, the standard unit 6 that is inserted into the compartment 18 is latched by the latching devices 36a and 36b.

The stop body 32 is provided for creating an end stop for the door 8 of such a standard unit 6 to limit its angular motion to prevent contact with the box 16 or any other installation next to the compartment 18. The stop body 32 is designed for automatically pivoting into an extended position as shown in the following figures.

In FIG. 3, the stop body 32 is shown in a lateral view. On the left-hand side in the drawing plane, the front 34 is shown. The stop body 32 is pivotally supported in the recess 30, wherein the pivoting axis 40 is distanced from the center of gravity 42 of the stop body 32. The stop body 32 furthermore comprises a first end 44, which is arranged at a bottom, and a second end 46, which is arranged at the top, i.e. vertically above the first end 44.

In the left part of FIG. 3, the stop body 32 is in a retracted position. Here, the stop body 32 is substantially flush with the front 34. Since the pivot axis 40 is further away from the front 34 than the center of gravity 42 and since the pivot axis 40 is arranged further downwards, the stop body 32 automatically pivots about the pivot axis 40 by gravity if the stop body 32 is not blocked.

If the stop body 32 is in an extended position, which is shown in the right half of FIG. 3, the second end 46 protrudes from the recess 30 and thus sticks out from the front 34. If the hinge axis for the door 8 is directly adjacent to the recess the door 8 of the standard unit 6 may still swivel, but will contact the second end 46 of the stop body 32 when reaching an opening angle that exceeds 90°. Hence, if the stop body 32 is not blocked, it will automatically travel into the extended position and acts as an angle limiter for the door 8. The second end 46 may protrude from the front 34 about a distance of e.g. 5 to 25 cm and in particular to 20 cm and preferably as far as possible.

Figure 4:
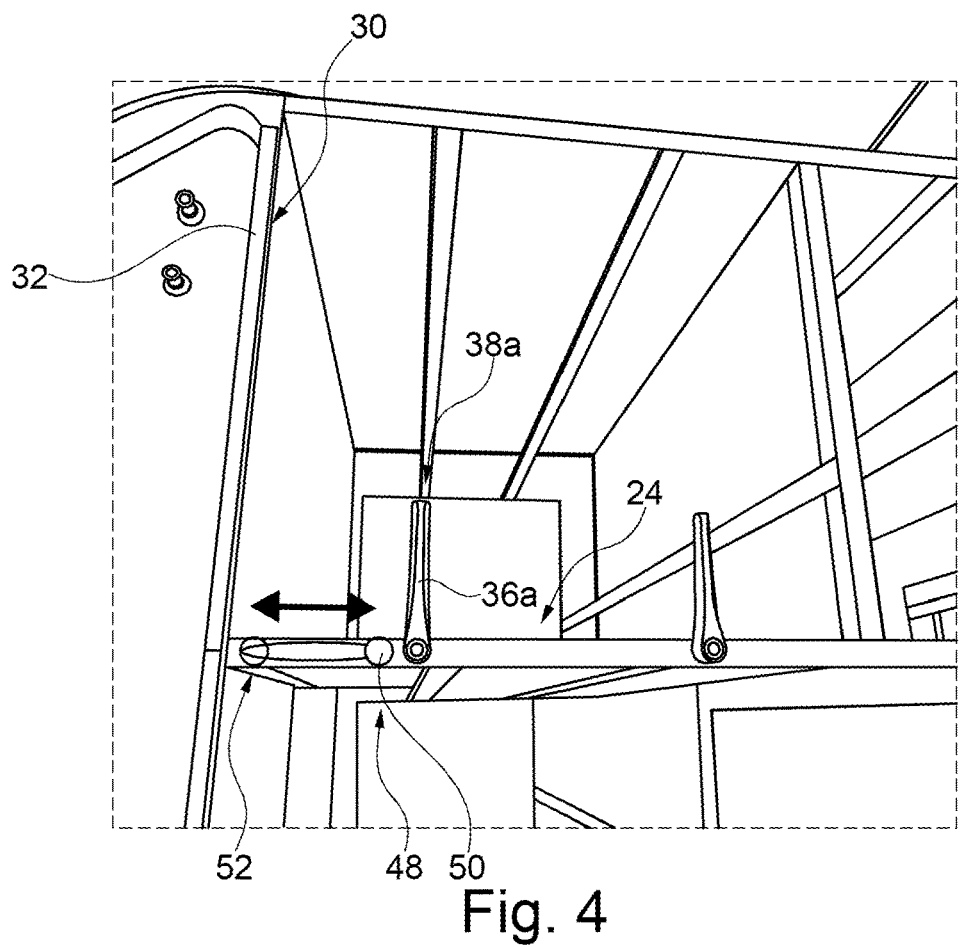
FIG. 4 shows the compartment with the stop body.

It is beneficial if the stop body 32 is blocked in situations, in which it is not required, i.e. in which the door 8 remains closed and latched. For this, a locking device 48 is provided, which is indicated in FIG. 4 and shown in further detail in FIGS. 5a to 7c. The locking device 48 comprises an operating knob 50, which sticks out the bottom wall 24 over the front 34 directly adjacent to the left latching device 36a. An operator can move the operating knob 50 horizontally along the bottom wall 24. If the operating 50 is directly adjacent the left latching device 36a, the latching device 36a cannot be moved in a completely horizontal position in front of the bottom wall 24. Hence, the door 8 cannot be unlatched and thus cannot be opened. Only when the operating knob 50 is moved to the left to a position indicated with the reference numeral 52, the latching device 36a can be moved to a horizontal position. When also the right latching device 36b is horizontal, the door 8 can be opened.

Figure 5A:
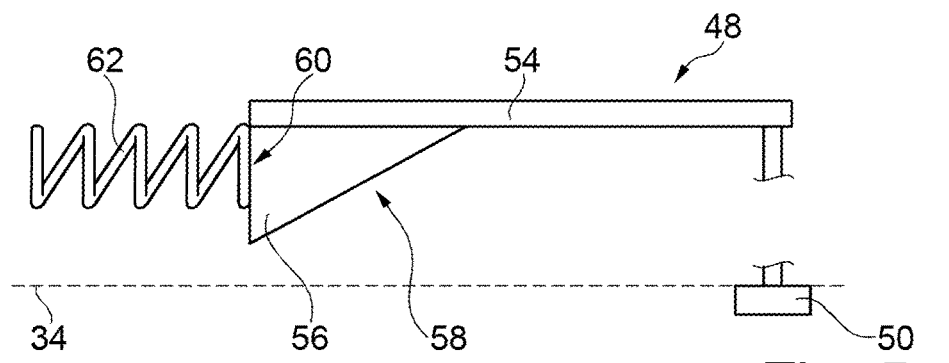
FIG. 5a through 5d show a locking device in different illustrations and locking states.
Figure 5B:
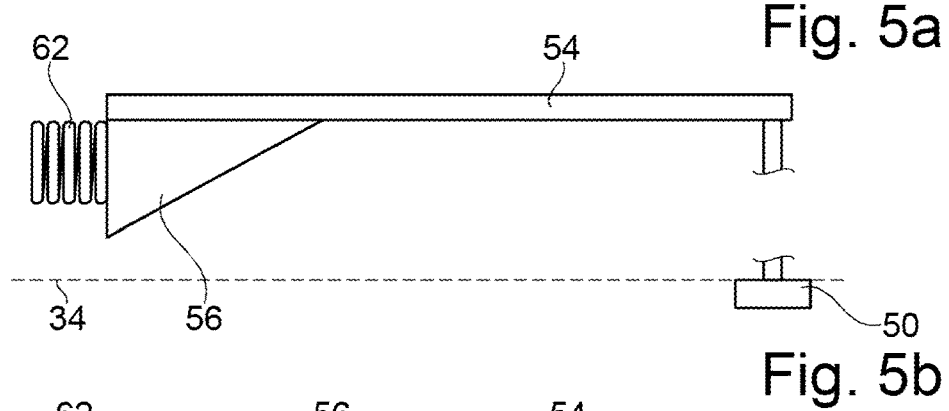

FIG. 5a shows the locking device 48 in a schematic view. Here, the operating knob 50 is on the right-hand side in the drawing plane and is connected with a rod 54, which carries a wedge body 56 having a wedge surface 58 that points to the front 34. At a side surface 60 of the wedge body 56, a resilient element in the form of a spring 62 is provided. The spring 62 urges the wedge body 56 to the right-hand side of the drawing plane. This is shown in FIG. 5b, where the operating knob 50 has moved the wedge body 56 to the left-hand side, such that the spring 62 is compressed and urges the wedge body 56 back to the right-hand side. The spring 62 rests on a fixed point of the compartment enclosure assembly 20, such that it is able to urge the wedge body 56 away. As an alternative or in addition thereto, a tension spring may be provided on the other side of the wedge body 56.

Figure 5C:
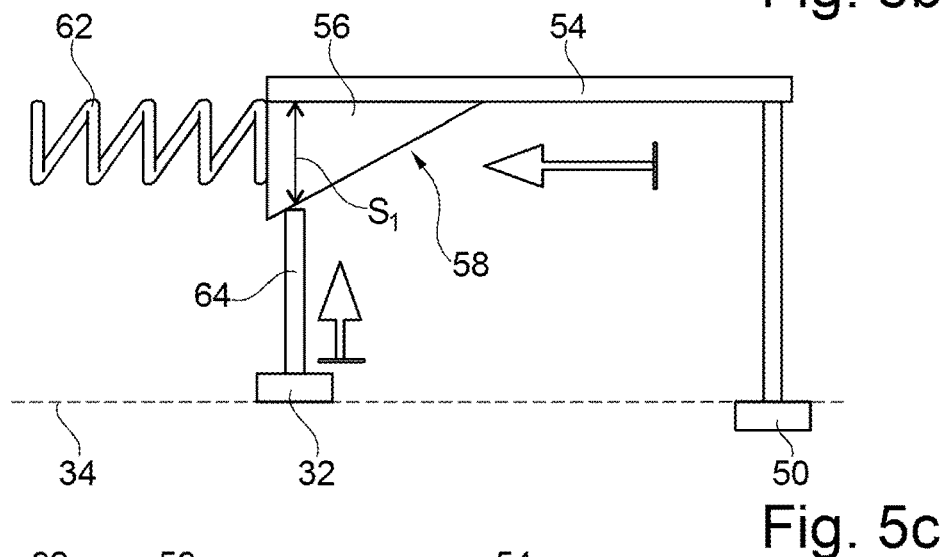
Figure 5D:
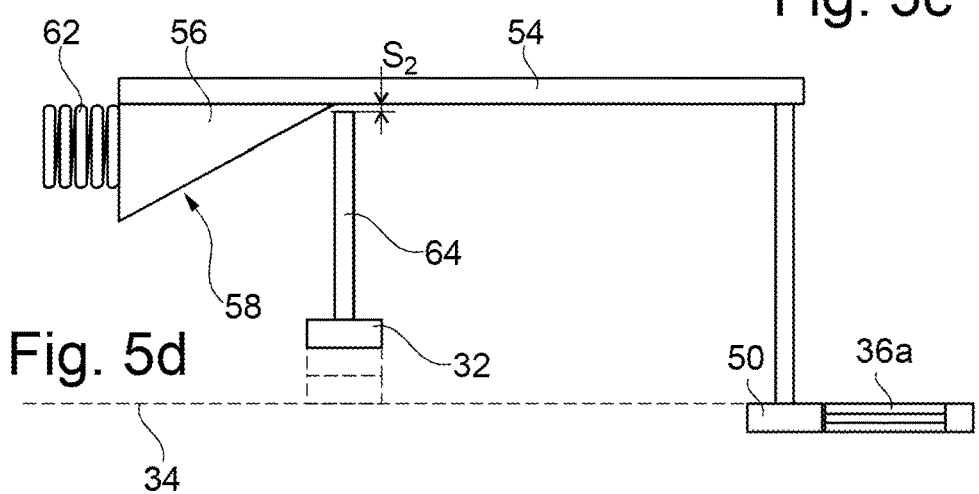

FIG. 5c schematically shows a push pin 64, which is slidably supported perpendicular to a plane spanned by the front 34, resting flushly on the wedge surface 58. Here, the wedge body 56 is in its first sliding position and a local thickness of the wedge body 56 $s_1$ is at a maximum, such that the push pin 64 is moved outwards to the front 34. The push pin 64 pushes the first end 44 of the stop body 32 to the front 34.

When moving the operating knob 50 to the left, the wedge surface 58 travels along the rear side of the push pin 64 until the local thickness is at a minimum 52. Hence, the first end 44 of the stop body 32 is not pushed outwards to the front 34. Driven by gravity, the first end 44 of the stop body 32 travels inwards, i.e. away from the front 34, and the second end 46 travels outwards to protrude from the front 34. By releasing the knob 50, the spring 62 urges the wedge body 56 back into the first sliding position shown in FIGS. 5a and 5c and thus retracts the stop body 32 again. The operating knob 50 can be arranged in such a way, that when the latching device 36a is in an open state, it holds the operating knob 50 in the second sliding position of FIGS. 5b and 5d.

FIGS. 6a and 6b show the stop body 32 and the push pin 64 in lateral views. Here, FIG. 6a corresponds to FIG. 5c and shows the push pin 64 holding the stop body 32 in the retracted position. FIG. 6b shows the push pin 64 releasing the stop body 32 and corresponds to FIG. 5d. The transition from the second sliding position to the first sliding position is shown in FIG. 6c in a top view. Here, the push pin 64 pushes the stop body 32 to the front 34. This is shown in FIG. 6d in a lateral view.

Figure 7A:
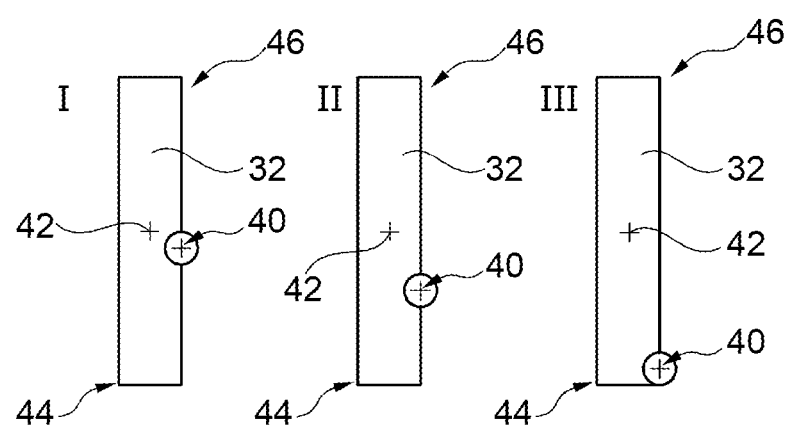
FIG. 7a through 7c show different design options for the stop body, latching elements, and wedge bodies in different illustrations.

FIG. 7a shows different possible pivot axes 40 in three examples I, II and III. The lower the pivot axis 40, the higher the degree of travel of the stop body 32 and the further the extension of the second end 46. The design of the stop body 32 and the position of the pivot axis 40 can be chosen depending on the requirements, e.g. the allowed door angle.

Figure 7B:
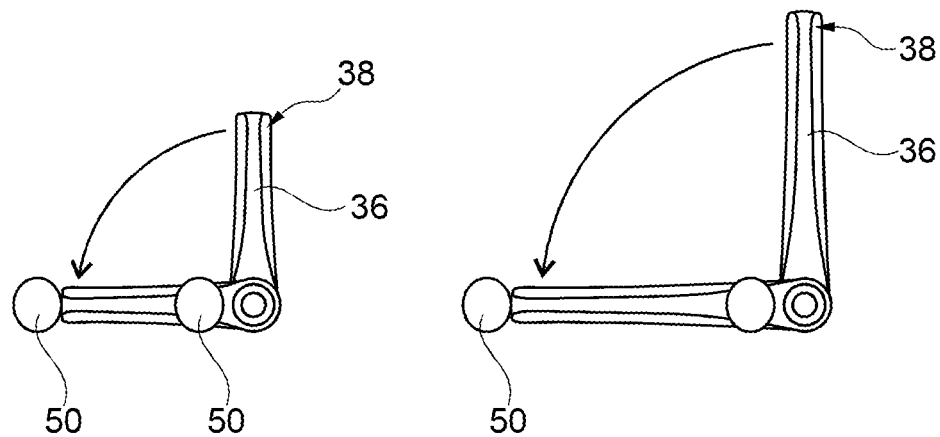
Figure 7C:
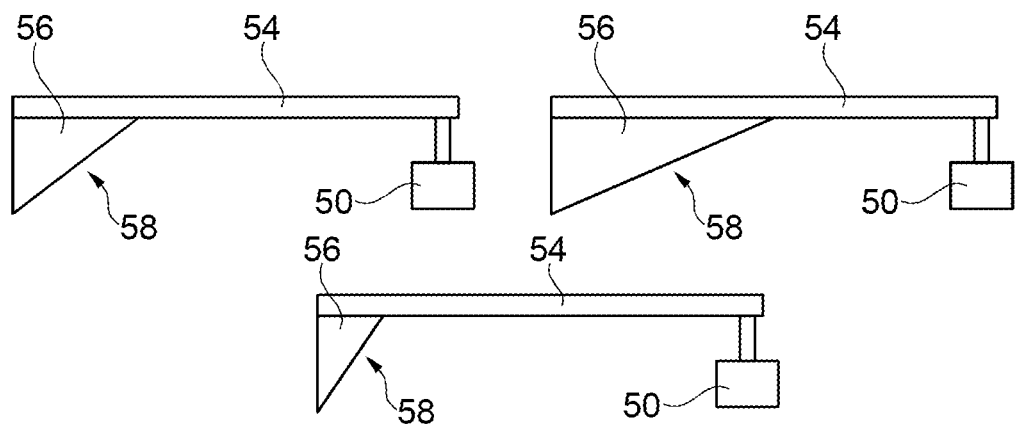

FIG. 7b shows a latching device 36 with two different lengths in two examples I and II. The length of the latching device 36 may be a dimensioning factor for the wedge body 56 if the position of the operating knob 50 in the extended position of the stop body 32 should not be far away from the free end 38 of the latching device 36 in its horizontal orientation. Longer latching devices 36 may allow to reduce the slope of the wedge surface 58 or to increase the pivoting motion of the stop body 32 with the same slope of the wedge surface 58. This may depend on the available installation space and/or the desired length of the latching devices 36. FIG. 7c shows three differently designed wedge bodies 56 in three examples I, II and III, wherein the travel distance of the push pin 64 is the same for every wedge body 56, but achieved with different sliding motions of the wedge body 56 and the knob 50.

Figure 8:
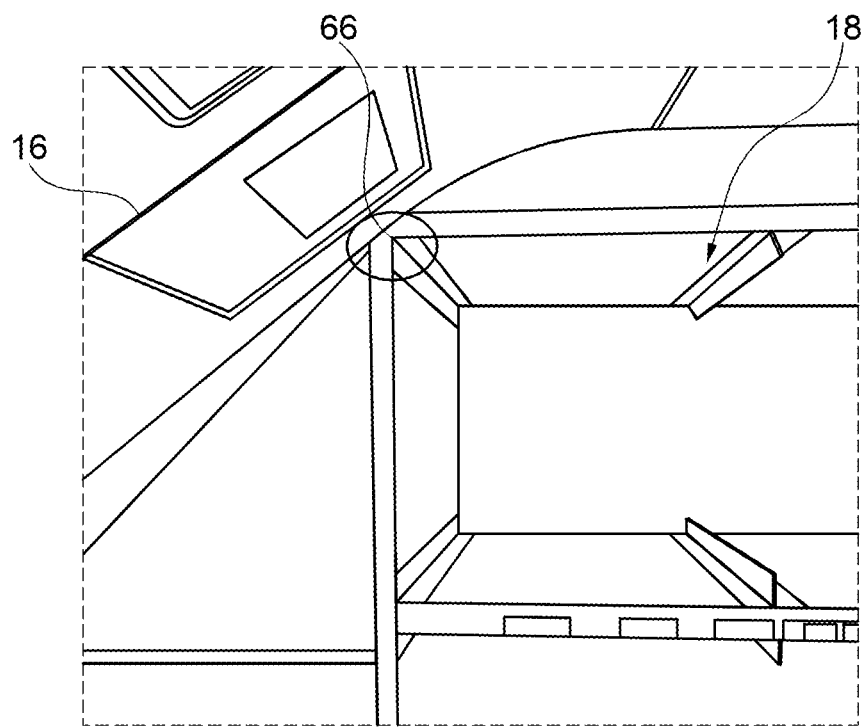
FIG. 8 shows an installation environment for the compartment close to a sidewall.

In FIG. 8, the box 16 or other equipment or lining is close to an upper outboard edge 66 of the compartment 18. Here, the stop body 32 may also function as a kind of guide rail during insertion of a standard unit 6 during catering or service. The upper outboard edge 66 of the standard unit 6 is hard to see during insertion and may weigh as much as 10 kg and may need to be lifted to a height of about 1.7 m. To avoid contact with other equipment, the stop body 32 also supports the insertion.

Figure 9:
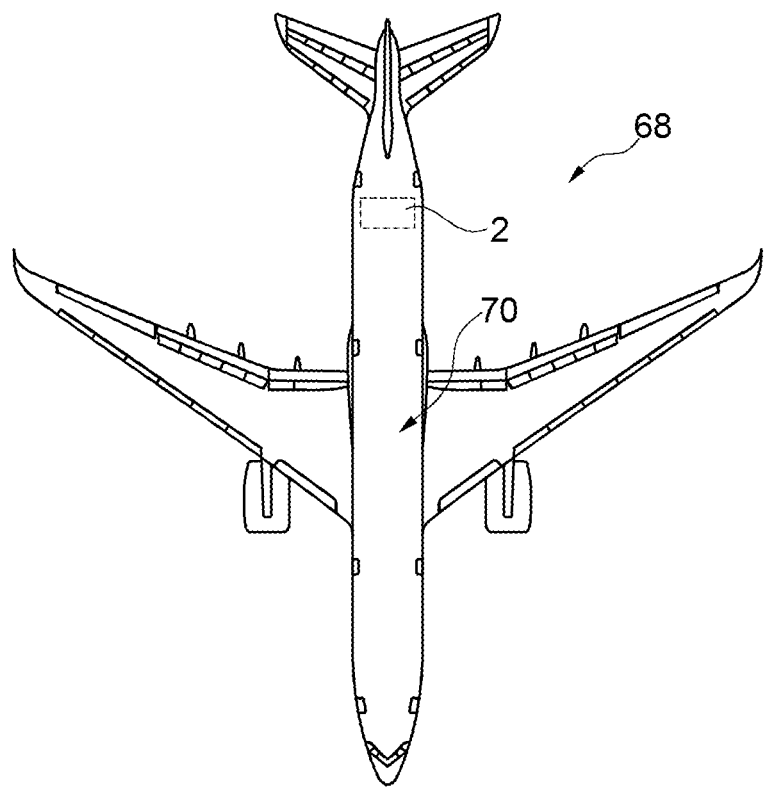
FIG. 9 shows an aircraft.

Lastly, FIG. 9 shows an aircraft 68 having a cabin 70, in which a galley 2 having at least one of the above-described compartment 18 is installed.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A compartment for a cabin in a vehicle, comprising:
   a compartment enclosure assembly defining an outer boundary of the compartment and comprising a receiving space;
   a stop body supported on or in the compartment enclosure assembly; and
   a locking device;
   wherein the receiving space is configured to be accessible from a front of the compartment enclosure assembly, wherein the stop body is pivotally mounted on or in the compartment enclosure assembly to move about a pivot axis between a retracted position, in which the stop body does not project from the front, and an extended position, in which the stop body projects from the front to provide an end stop for limiting angular motion of a door of the compartment or of a door of an insert to be inserted into the receiving space, wherein the locking device is configured to selectively lock and unlock the stop body in its retracted position; and wherein the stop body has a center of gravity, which is distanced from the pivot axis, such that the stop body automatically pivots into the extended position by gravity when the locking device unlocks the stop body.

2. The compartment of claim 1, wherein the stop body has an elongate shape with a first end and an opposite second end, and wherein the second end is arranged vertically above the first end.

3. The compartment of claim 2, wherein the second end moves away from the front to protrude from the front in the extended position.

4. The compartment of claim 1, wherein the stop body is substantially flush with the front in the retracted position.

5. The compartment of claim 1, wherein the locking device comprises a wedge body, which is movably supported on or in the compartment enclosure assembly to be slidable parallel to the pivot axis between a first sliding position and a second sliding position, wherein the wedge body comprises a wedge surface that faces to the front, wherein a lower rear section of the stop body is coupled with the wedge surface of the wedge body, and wherein the wedge body is configured to move the stop body into the retracted position and to block the stop body in the first sliding position and to release the stop body in the second sliding position.

6. The compartment of claim 5, wherein the locking device is arranged at a bottom wall of the compartment enclosure assembly, such that the wedge body is movable in a lateral direction along the bottom wall.

7. The compartment of claim 5, wherein the locking device comprises a resilient element that urges the wedge body into the first sliding position.

8. The compartment of claim 1, wherein the compartment enclosure assembly comprises at least one latching element, which is rotatably supported on the front to selectively move it in front of the receiving space or to move it away from the receiving space.

9. The compartment of claim 5, wherein the compartment enclosure assembly comprises at least one latching element, which is rotatably supported on the front to selectively move it in front of the receiving space or to move it away from the receiving space; and wherein the locking device and the at least one latching element are arranged on the compartment enclosure assembly such that the latching element is blocked in front of the receiving space when the locking device is in the first sliding position, and that the at least one latching element can be moved away from the receiving space when the locking device is in the second sliding position.

10. The compartment of claim 1, wherein the compartment enclosure assembly comprises a recess in a lateral wall, in which the stop body is supported.

11. The compartment of claim 1, wherein the receiving space is substantially hollow and configured for receiving a standard unit.

12. A cabin monument for a cabin of an aircraft, comprising at least one compartment according to claim 1.

13. The cabin monument of claim 12, wherein at least one lateral wall of the cabin monument is curved to complement a shape of a curved fuselage of the aircraft, in which the cabin is created.

14. An aircraft comprising a cabin and having at least one cabin monument according to claim 12.

15. An aircraft comprising a cabin and having at least one compartment according to claim 1.

* * * * *